United States Patent [19]

Jones

[11] 4,165,526
[45] Aug. 21, 1979

[54] MAGNETIC TAPE CLEANER

[76] Inventor: Dennis R. Jones, 38250 SE. Lusted Rd., Boring, Oreg. 97009

[21] Appl. No.: 871,709

[22] Filed: Jan. 23, 1978

[51] Int. Cl.$^2$ .......................... G11B 5/41; G11B 23/50
[52] U.S. Cl. ........................................ 360/137; 15/100
[58] Field of Search ............ 360/137, 128; 15/210 R, 15/210 B, 256.5, 246, 97 R, 100

[56] References Cited

U.S. PATENT DOCUMENTS

| 3,266,196 | 8/1966 | Barcaro | 360/137 |
| 3,370,982 | 2/1968 | Hayunga | 360/137 |
| 3,767,210 | 10/1973 | Havens | 15/210 R |
| 3,964,104 | 6/1976 | Herron | 15/210 R |
| 4,010,514 | 3/1977 | Fischer | 360/137 |
| 4,053,045 | 10/1977 | Reiter | 15/256.6 |
| 4,081,878 | 4/1978 | Seidel | 360/137 |

*Primary Examiner*—Jay P. Lucas
*Attorney, Agent, or Firm*—Kolisch, Hartwell, Dickinson & Stuart

[57] ABSTRACT

A tape cleaner for mounting on a magnetic tape recorder between take-up reels on the recorder includes opposed cleaning elements for receiving a stretch of tape therebetween and wiping the tape on both sides thereof as the tape is drawn therethrough. A mounting is also provided for mounting the cleaning elements on the recorder which permits the cleaning elements to reorient both rectilinearly and rotationally in response to a change in tape position relative to the mounting.

5 Claims, 3 Drawing Figures

MAGNETIC TAPE CLEANER

BACKGROUND AND SUMMARY OF THE INVENTION

The present invention relates generally to magnetic tape recorders, and more particularly to a novel tape cleaner which may be readily mounted on the recorder for cleaning magnetic tape before it enters a recording head.

In magnetic tape recorders including a pair of spaced-apart take-up reels, a problem resides in adequately maintaining the magnetic tape in a clean condition. For instance, magnetic tape, when new, generally includes an excess amount of magnetic oxide which must be cleaned off. Continued use of the tape generally results in a build up of dust or other foreign material which substantially interferes with the recording or playback characteristics of the tape. Some tape manufacturers recommend that the tape be periodically cleaned by manually holding a piece of cloth for wiping off excess magnetic oxide or dust as the tape is run from one reel to another. In the case of rather large tape recorders, it may take considerable time as well as being generally inconvenient to perform such a cleaning operation.

It is necessary to maintain the tape in relatively clean condition so that so-called "drop outs" do not occur. This refers to the fact that a recording head or a playback head may not pick up the proper frequency range if the tape is not clean. An additional problem resides in the fact that a tape drive, such as a pinch roller used in combination with a drive roller may not adequately feed the tape from one reel to another if magnetic oxide and dust are accumulated beyond a certain level. Speed variations, known as "wow and flutter" may result from tapes having an excess of magnetic oxide and dust.

There have been several proposals to provide a tape cleaning device on magnetic tape recorders but such generally are expensive or inefficient. In addition, known methods for cleaning magnetic tapes are cumbersome and complex.

Accordingly, it is a general object of the present invention to provide a tape cleaner for use in a magnetic tape recorder which is positioned in advance of the recorder's recording head for receiving a stretch of tape therebetween and for wiping the tape on both sides thereof as the tape is drawn therethrough. It is contemplated that the tape cleaner is detachably mounted on the tape recorder and will also reorient in response to a change in the position of the tape relative to its direction of feed into the recording head. Specifically, the position of a tape will be altered as tape is either payed out or reeled in on a take-up reel.

Another object of the present invention is to provide a mount for mounting the tape cleaner on the recorder which will shift in a substantially rectilinear path as well as rotate to accommodate orientation of the tape as it is drawn through the recording head.

Still another object of the present invention is to provide a tape cleaner which includes a pair of opposed cleaning elements which are mounted on a rotatable spindle for at least limited rotation.

These and additional objects and advantages of the present invention will be appreciated from a consideration of the drawings and the following detailed description of the preferred embodiment.

DETAILED DESCRIPTION OF THE PREFERRED EMBODIMENT

Figure 1:
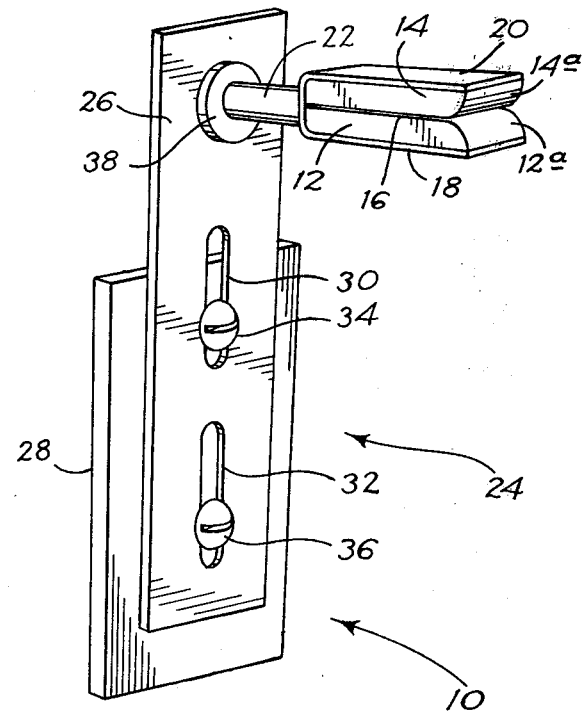
FIG. 1 is a perspective view of a tape cleaner, according to the present invention, isolated from a magnetic tape recorder.

Turning now to the drawings, and referring initially to FIG. 1, a tape cleaner according to the present invention is generally designated at 10. Tape cleaner 10 is constructed with a cleaning means including opposed cleaning elements 12, 14 each having a planar surface facing toward an opposed planar surface. It is contemplated that felt material or other suitable, somewhat resilient and absorbent material may be used as the cleaning elements. As illustrated, cleaning elements 12, 14 are positioned adjacent each other so that a tape receiving gap 16 is presented therebetween. Cleaning elements 12, 14 are provided with bevelled front edges 12a, 14a respectively for facilitating insertion of the tape into gap 16. Thus, the cleaning elements may receive a stretch of tape therebetween for wiping the tape on both sides thereof as the tape is drawn therethrough. Further, it is to be noted that supporting members 18, 20 are provided for holding cleaning elements 12, 14 and are secured to a spindle means 22. Details of spindle means 22 will be described at a later point.

Still referring to FIG. 1, a mounting means is generally indicated at 24 and includes a first member 26 which is mounted on and shiftable relative to a second member 28. Adhesive material is provided on the back of second member 28. First member 26 is provided with a pair of elongate slots 30, 32 which extend generally in the longitudinal direction of the first member. Second member 28 is provided with guide means such as pin means 34, 36 which cooperate with an associated slot in first member 26 for guiding the first member in a substantially rectilinear path during shifting of the first member. It is to be noted that slots 30, 32 receive pin means 34, 36 respectively and that the pin means are provided with portions which overlap edges of the slots so that first member 26 is maintained against second member 28. As shown, pin means 34, 36 may suitably utilize screw heads.

As mentioned previously, cleaning elements 12, 14 are rigidly mounted to support members 18, 20 which are in turn rigidly secured to spindle means 22. The spindle means is rotatably mounted at an upper end of first member 26 by a suitable collar or other rotatable mount. Thus, it can be seen that spindle means 22 permits the cleaning elements to rotate about the longitudinal axis of the spindle means which extends generally perpendicularly relative to first member 26. The orientation of cleaning elements 12, 14 may thereby be varied not only in a rectilinear path relative to second member 28 but also in a rotational path.

Figure 2:
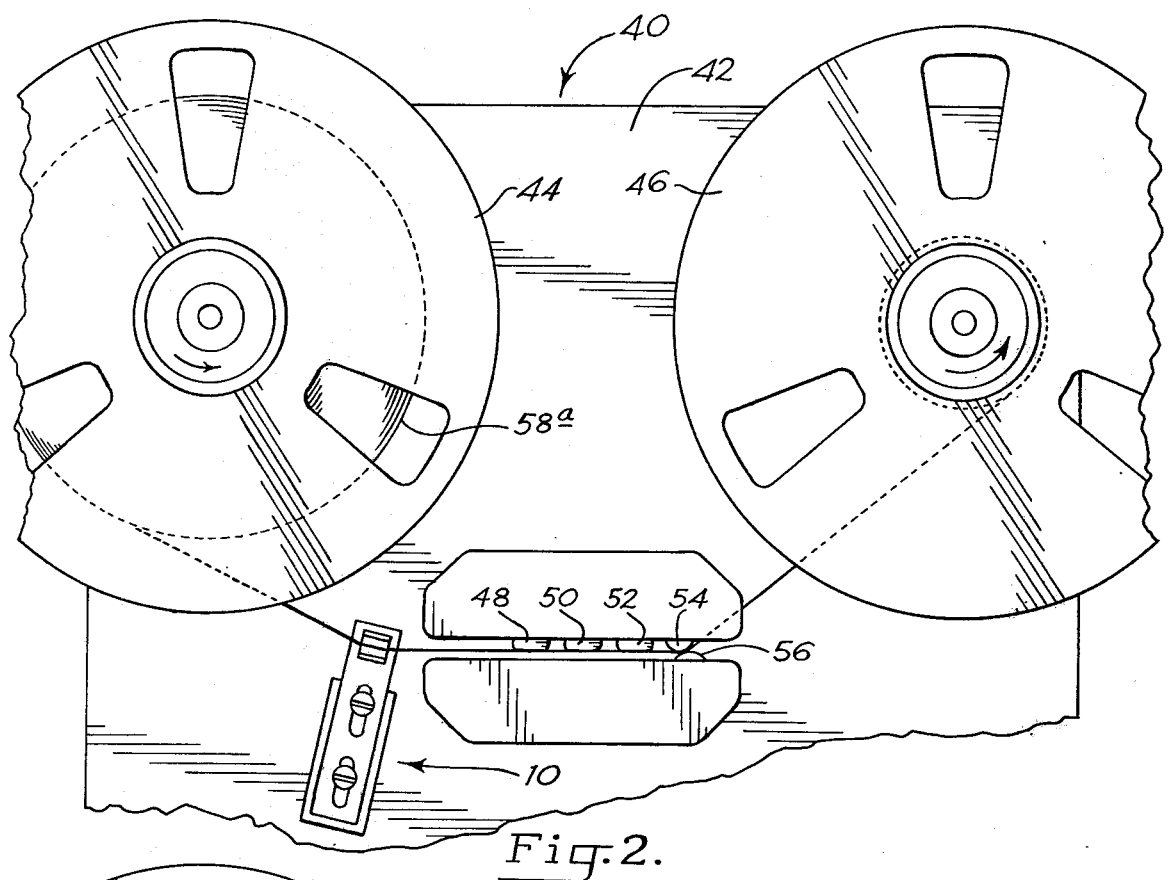
FIG. 2 is a front elevation view of a magnetic tape recorder illustrating positioning of the tape cleaner for cleaning a stretch of tape as the tape is being wound on a take-up reel.

Turning now to FIG. 2, there is shown the magnetic tape cleaner of the present invention mounted on a magnetic tape recorder generally indicated at 40. Tape recorder 40 includes a casing 42 and a pair of horizonmay be positioned generally as shown in FIG. 2 so that cleaning action will result. It is a simple matter to insert a stretch of tape between the cleaning elements due to the bevelled front edges provided thereon. For purposes of illustration, it will be assumed that tape 58 is wound on reel 44 with a certain diameter indicated at 58a. Of course, as tape is taken up on reel 46, diameter 58a will decrease while the amount of tape on reel 46 will increase.

Figure 3:
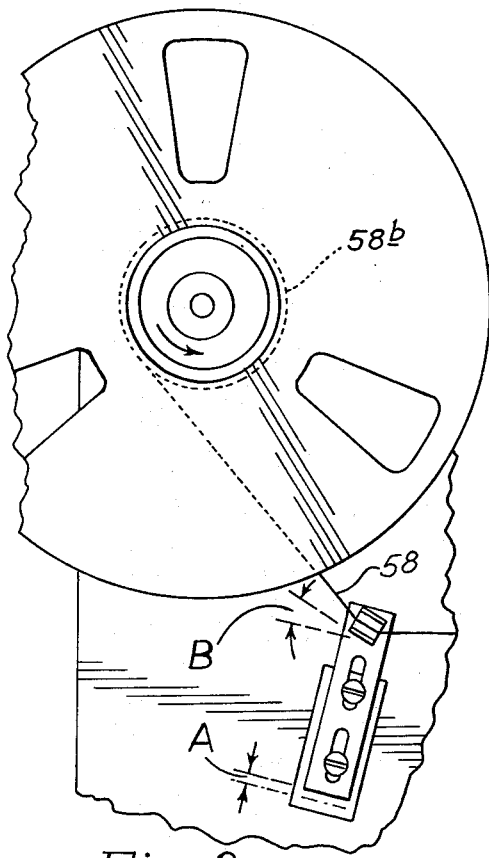
FIG. 3 is a partial view, similar to FIG. 2, illustrating reorientation of the tape cleaner as tape is being payed out from one of the reels.

Considering now FIG. 3, it can be seen that after a period of playing or recording time, the diameter of tape wound on reel 44 (indicated at 58b) will decrease as tape is taken up on reel 46. It can also be seen that the angle of the tape as it is being fed into the heads will increase, relative to the horizontal, as the diameter of the tape on reel 44 decreases. It can be seen that mounting means 24 of tape cleaner 10 readily permits the cleaning elements to re-orient in response to a change in the position of the tape relative to the mounting means. Specifically, it can be seen that first member 26 has shifted upwardly a distance represented at A and that the cleaning elements have rotated somewhat in the clockwise direction indicated by an angle B. Thus, tape 58 will be permitted to freely pass through the heads and will not bind because of the reorientation of the cleaning elements as the tape feed angle varies. Of course, continuous cleaning action is maintained on both sides of the tape as it is drawn through the cleaning elements.

Because tape cleaner 10 of the present invention permits rectilinear as well as rotational reorientation of the cleaning elements, it can be appreciated that initial positioning of tape cleaner 10 is not critical. To elaborate, an eyeball determination of the positioning of tape cleaner 10 on casing 42 generally is sufficient as long as the tape may be situated between the cleaning elements.

From the above, it can be seen that the present invention provides several notable advantages. First of all, the construction of tape cleaner 10 is uncomplicated and may be used without altering a tape recorder. As described above, it is only necessary to mount tape cleaner 10 in approximate position and insert a stretch of tape between cleaning elements 12, 14. Additionally, the tape cleaner may be constructed of relatively small dimensions so that it can be placed in advance of a recording head so that it will not interfere with various control devices on the tape recorder. Further, if de- While the tape cleaner of the present invention has been shown in use with a large magnetic tape recorder, it must be remembered that other uses are contemplated. For instance, a scaled-down version of the tape cleaner could be provided on cassette or other smaller recorders.

While the invention has been particularly shown and described with reference to the foregoing preferred embodiment, it will be understood by those skilled in the art that other changes in form and detail may be made therein without departing from the spirit and scope of the invention as defined in the appended claims.

It is claimed and desired to secure by Letters Patent:

1. For use in a magnetic tape recorder having a recording head positioned between a pair of take-up reels, a tape cleaner comprising:

cleaning means including opposed cleaning elements each having a planar surface for receiving a stretch of tape therebetween and for wiping the tape on both sides thereof as the tape is drawn therethrough; and mounting means for mounting said cleaning means on the recorder and for permitting said cleaning means to rotatably reorient in response to a change in the feed angle of the tape relative to said mounting means, said mounting means also including a first member which is mounted on and shiftable relative to a second member, said first member supporting said cleaning means and said second member being mounted on the recorder.

2. The tape recorder of claim 1 wherein said cleaning means is mounted on said first member for at least limited rotation relative thereto.

3. The tape recorder of claim 2 further including spindle means extending generally perpendicularly from said first member for mounting said cleaning means.

4. The tape recorder of claim 1 wherein said second member is provided with guide means which cooperate with said first member for guiding said first member in a substantially rectilinear path during shifting of said first member.

5. The tape recorder of claim 4 wherein said guide means includes pin means, said first member including a slot dimensioned for receiving said pin means.

* * * * *